United States Patent [19]
Shimakawa et al.

[11] Patent Number: 6,055,536
[45] Date of Patent: Apr. 25, 2000

[54] INFORMATION PROCESSING APPARATUS AND INFORMATION PROCESSING METHOD

[75] Inventors: Masato Shimakawa, Kanagawa; Makoto Akabane; Bao Hongchang, both of Tokyo; Junichi Rekimoto, Kanagawa; Hiroaki Kitano, Saitama; Kazunori Sasano, Chiba; Kazuo Ishii; Keiichi Yamada, both of Kanagawa; Hiroaki Ogawa, Tokyo; Hiroshi Kakuda; Yasuharu Asano, both of Kanagawa; Hitoshi Honda, Tokyo; Satoshi Fujimura, Tokyo; Atsuo Hiroe, Tokyo, all of Japan

[73] Assignee: Sony Corporation, Tokyo, Japan

[21] Appl. No.: 08/868,443

[22] Filed: Jun. 3, 1997

[30] Foreign Application Priority Data

Jun. 11, 1996 [JP] Japan .................. 8-171900

[51] Int. Cl.7 .................................. G06F 17/30
[52] U.S. Cl. ...................... 707/101; 707/100; 707/102
[58] Field of Search ................. 707/10, 3, 104, 707/2, 101, 100, 102; 395/144; 379/89

[56] References Cited

U.S. PATENT DOCUMENTS

| | | |
|---|---|---|
| 5,193,114 | 3/1993 | Moseley ........................ 380/23 |
| 5,231,691 | 7/1993 | Yasuda ........................ 707/2 |
| 5,319,745 | 6/1994 | Vinsonneau et al. ........... 395/144 |
| 5,513,356 | 4/1996 | Takahashi et al. ............. 395/700 |
| 5,526,407 | 6/1996 | Russell et al. ................. 379/89 |
| 5,530,854 | 6/1996 | Emery et al. ................. 707/3 |
| 5,542,087 | 7/1996 | Neimat et al. ................. 707/2 |
| 5,704,013 | 12/1997 | Watari et al. ................. 395/23 |
| 5,717,953 | 2/1998 | Tsutsui et al. ................. 395/865 |
| 5,761,496 | 6/1998 | Hattori ........................ 707/5 |
| 5,764,853 | 6/1998 | Watari et al. ................. 395/2.52 |
| 5,771,354 | 6/1998 | Crawford ..................... 395/200.59 |
| 5,774,878 | 6/1998 | Marshall ...................... 705/35 |
| 5,787,414 | 7/1998 | Mike et al. ................... 707/2 |
| 5,787,433 | 7/1998 | Plotkin et al. ................. 707/101 |
| 5,796,921 | 8/1998 | Minamino et al. ............. 395/22 |
| 5,848,389 | 12/1998 | Asano et al. .................. 704/239 |

*Primary Examiner*—Thomas G. Black
*Assistant Examiner*—Frantz Coby
*Attorney, Agent, or Firm*—Limbach & Limbach LLP; Seong-Kun Oh

[57] ABSTRACT

An information processing system stores information of various types, which is obtained in the real world, in connection with keys indicative of the attribute and feature of the information so that the real-world information is stored quickly and surely in the virtual world which is formed of the linkage of information and stored information of various types is retrieved easily.

105 Claims, 14 Drawing Sheets

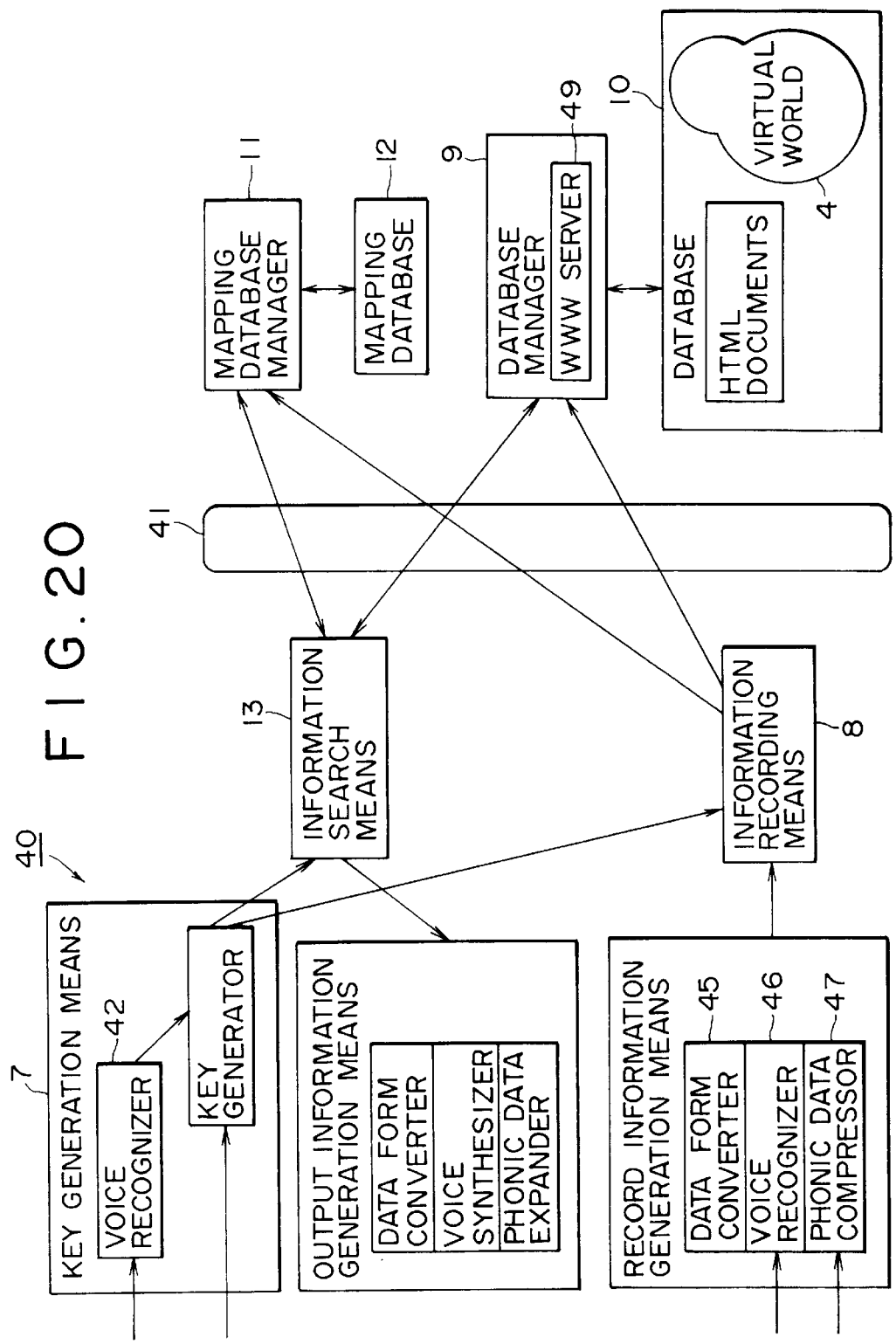

INFORMATION PROCESSING APPARATUS AND INFORMATION PROCESSING METHOD

BACKGROUND OF THE INVENTION

1. Field of the Invention

The present invention relates to an information processing system which stores information of various types, which is obtained in the real world, in connection with keys indicative of the attribute and feature of the information so that the real-world information is stored quickly and surely in the virtual world which is formed of information accumulated in the Internet, for example, and stored information of various types is retrieved easily.

2. Description of Related Art

Conventionally, information networks such as the Internet are designed to accumulate information of various types (literal information, image information, phonic information, etc.) in the form of Hyper media (Hyper link) which is information of various types in organic connection, and provide a virtual world which is formed of the stored information for the user who makes access to the information.

The user can go around the virtual world accomplished by such an information network as Internet through the World Wide Web (WWW) which is formed by information of various types on the computers of multiple information servers based on the information link of the Hyper media. For making access to information in the WWW, the user needs to designate directly Uniform Resource Locator (URL) which describes a server and protocol for information access or trace the link established among information following the access to the information indicated by other URL. Namely, the conventional information network is deficient in that the user who intends to obtain information from the WWW must specify the address (URL) of the virtual world and cannot access to the intended information directly.

It would be convenient for the user to make access easily and surely to intended information without the knowledge of information which is needed in making access to the network. In this case, the user in the real world can obtain information of various types provided by the Internet by establishing a link between the real world and virtual world which is the organic connection of information. Based on the established link, the user who gets information of various types in the real world can store the information easily and surely in the information network, thereby forming an enriched information source. Moreover, based on the provision of a direct link between the real world and virtual world, various useful services are available for the user.

SUMMARY OF THE INVENTION

Based on the foregoing background concept, it is an object of the present invention to provide an information processing system which allows the user to store information of various types obtained in the real world quickly and surely into the virtual world which is formed of information accumulated in an information network, and also retrieve information of various types easily.

In order to achieve the above objective, the inventive information processing system produces keys indicative of the attribute and feature of information of the real world introduced by information input means, and stores the information in connection with the keys, thereby constructing a database.

Recording real-world information, which is introduced by the information input means and accompanied by keys indicative of the attribute or feature of the information, makes a link from the real world to the virtual world which is formed of database information based on the keys and enables the user to make access easily and surely to information of various types from the real world.

BRIEF DESCRIPTION OF THE DRAWINGS

FIG. 20 is a block diagram of the server connected with the terminal unit of FIG. 19.

DESCRIPTION OF THE PREFERRED EMBODIMENTS

Embodiments of the present invention will be explained in detail with reference to the drawings.

1. Basic Arrangement

Figure 1:
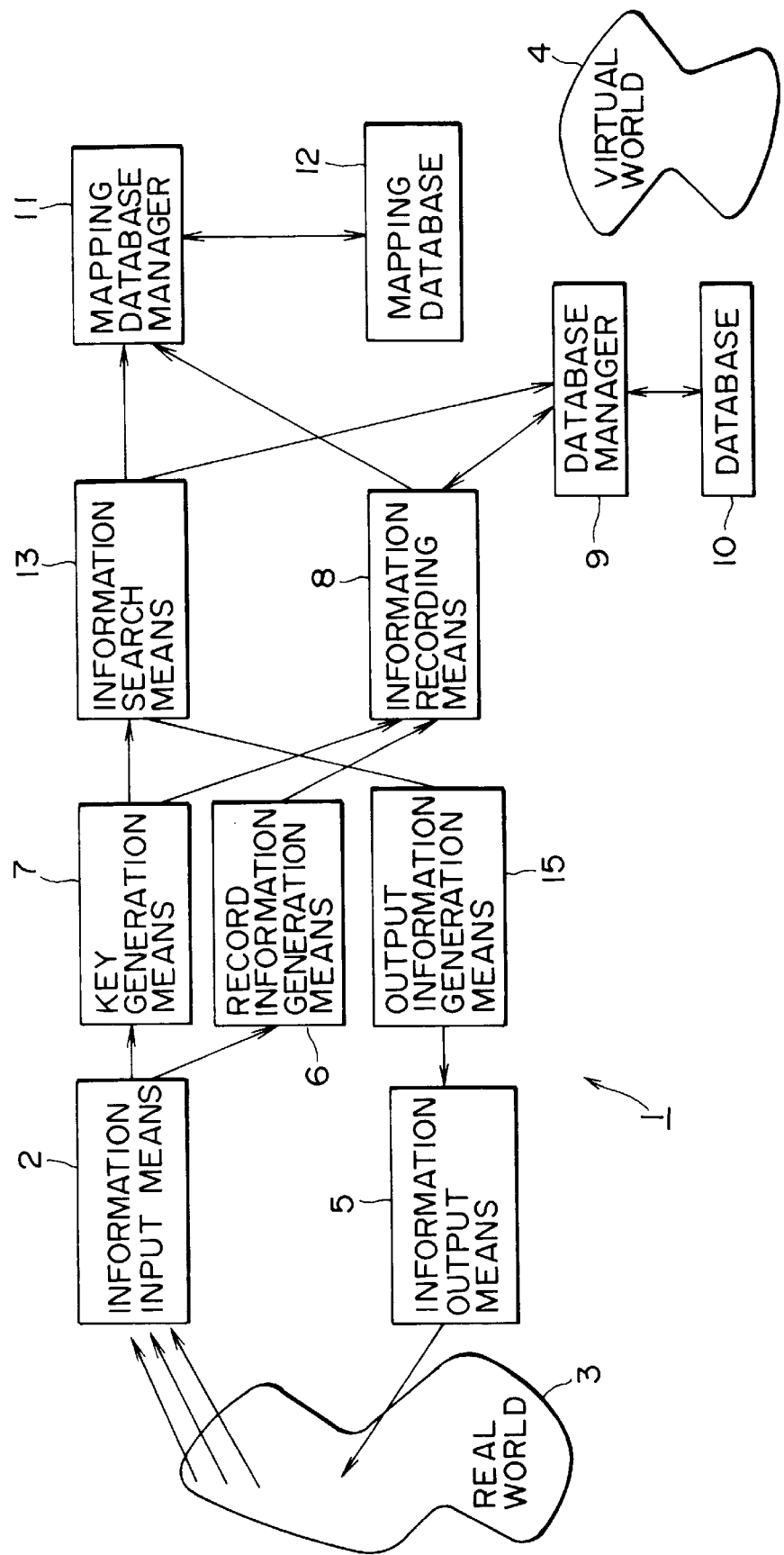
FIG. 1 is a block diagram showing the basic arrangement of the information processing system of this invention.

FIG. 1 shows the basic arrangement of the information processing system based on an embodiment of this invention. The information processing system 1 introduces information of various types from the real world 3 by way of an information input means 2 and forms a virtual world 4 by accumulating information in the form of a database. The information processing system 1 retrieves information of various types from the virtual world 4 and delivers the information to the real world 3 by way of an information output means 5.

In storing information into the database, the information processing system 1 generates keys indicative of the attribute and feature of the information, and forms a link between the real world 3 and virtual world 4 based on the keys. In contrast to information produced by the computation of a computer, information produced as a result of measurement by a measuring device or equipment will be called here "real-world information".

The virtual world signifies here a set of mutually-linked information formed in a network such as the Internet or a set of mutually-linked information formed in a single computer.

The information input means 2 receives information which will be the content of the database (e.g., information of sounds, images, texts, etc. called here "main information") from the real world 3, and when necessary also receives information which is needed to generate keys. The main information includes phonic, image and literal information, and information used to generate keys includes locative information and time-wise information.

A record information generation means 6 renders the data conversion for the main information so that it fits for the database. For example, main information of a phonic signal is converted into a digital signal and further converted into an audio information file of the WAV form or the like. Main information of an image signal is converted into a digital signal and further converted into video information or a video information file of the JPEG (Joint Photographic Experts Group) form, MPEG (Moving Picture Experts Group) form or the like.

A key generation means 7 generates keys, which can be key words, voice recognition results, time-wise information, etc., from the information provided by the record information generation means 6. In this case, the key generation means 7 generates keys based on keys which have been registered in advance in a mapping database 12 so that the generated keys correspond to the registered keys. An information recording means 8 accumulates main information provided by the record information generation means 6 in a database.

In the case of the WWW system of Internet, a database manager 9 stores main information in accordance with the address provided by the URL (Uniform Resource Locator) thereby to form a database 10, and retrieves main information from the database 10 in response to a request from an information search means 13. At this time, the database manager 9 stores the main information by filing it so as to be correspondent to reference information registered in advance (a document described in HTML (Hyper Text Markup Language) and registered in advance in the database 10 in correspondence to services offered by the information processing system). The HTML is a page description language (PDL) used mainly for describing web pages of multi-media information to be offered to users in the WWW of Internet.

A mapping database manager 11 operates in correspondence to the database manager 9 to record the URL address of the main information that corresponds to the keys to form the mapping database 12, thereby recording keys in connection with main information.

This embodiment is intended to form a virtual world by creating a database of main information. Accordingly, the database manager 9 and database 10 correspond to the web server and documents which are treated by the web server, respectively, of the WWW system of Internet.

Consequently, the mapping database manager 11 can map in the virtual world 4 the main information provided by the information recording means 8 in accordance with the keys which correspond to the preset reference information, and it can record information obtained in the real world easily and quickly. It can also retrieve information from the virtual world easily by making access to the database 10 based on the keys.

Specifically, at information search, the information search means 13 operates on the mapping database manager 11 to make access to the mapping database 12 in accordance with the keys provided by the key generation means 7 to search for a link that corresponds to the keys based on the reference information that corresponds to the user's request, thereby detecting the URL that corresponds to the keys. The information search means 13 retrieves main information from the database 10 in accordance with the URL.

An output information generation means 15 converts the output information provided by the information search means 13 so that it has a form fitted for an information output means 5. The information output means 5 delivers the main information, which forms the virtual world, to the real world 3.

2. Embodiment 1

Figure 2:
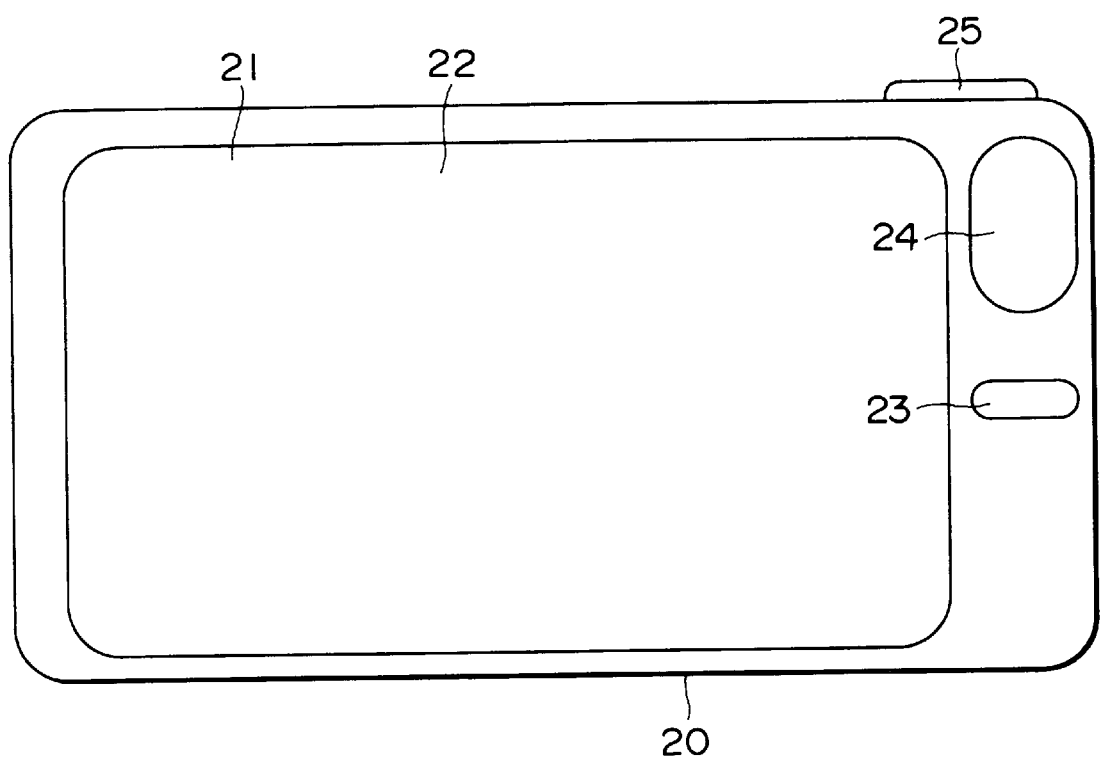
FIG. 2 is a top view of the terminal unit based on a first embodiment of this invention.

FIG. 2 is a top view of the terminal unit used in the information processing system based on the first embodiment of this invention. The terminal unit 20 is a flat-type portable radio terminal unit, and it includes on the top thereof a liquid-crystal display panel 21 and a transparent tablet 22 overlaid on the display panel 21. The liquid-crystal display panel 21 functions to display images, texts and a menu of operation, and the transparent tablet 22 is used by the user to choose an item of menu and enter hand-written characters.

Disposed on the right of the liquid-crystal display panel 21 is a microphone 23, by which the user can enter a spoken message, and disposed above the microphone 23 is an antenna 24 of GPS (Global Positioning System), by which information on the current location of the terminal unit 20 can be detected by the radio signal. Further disposed above the antenna 24 is a lens 25, by which the user can shoot a subject to be imaged.

Figure 3:
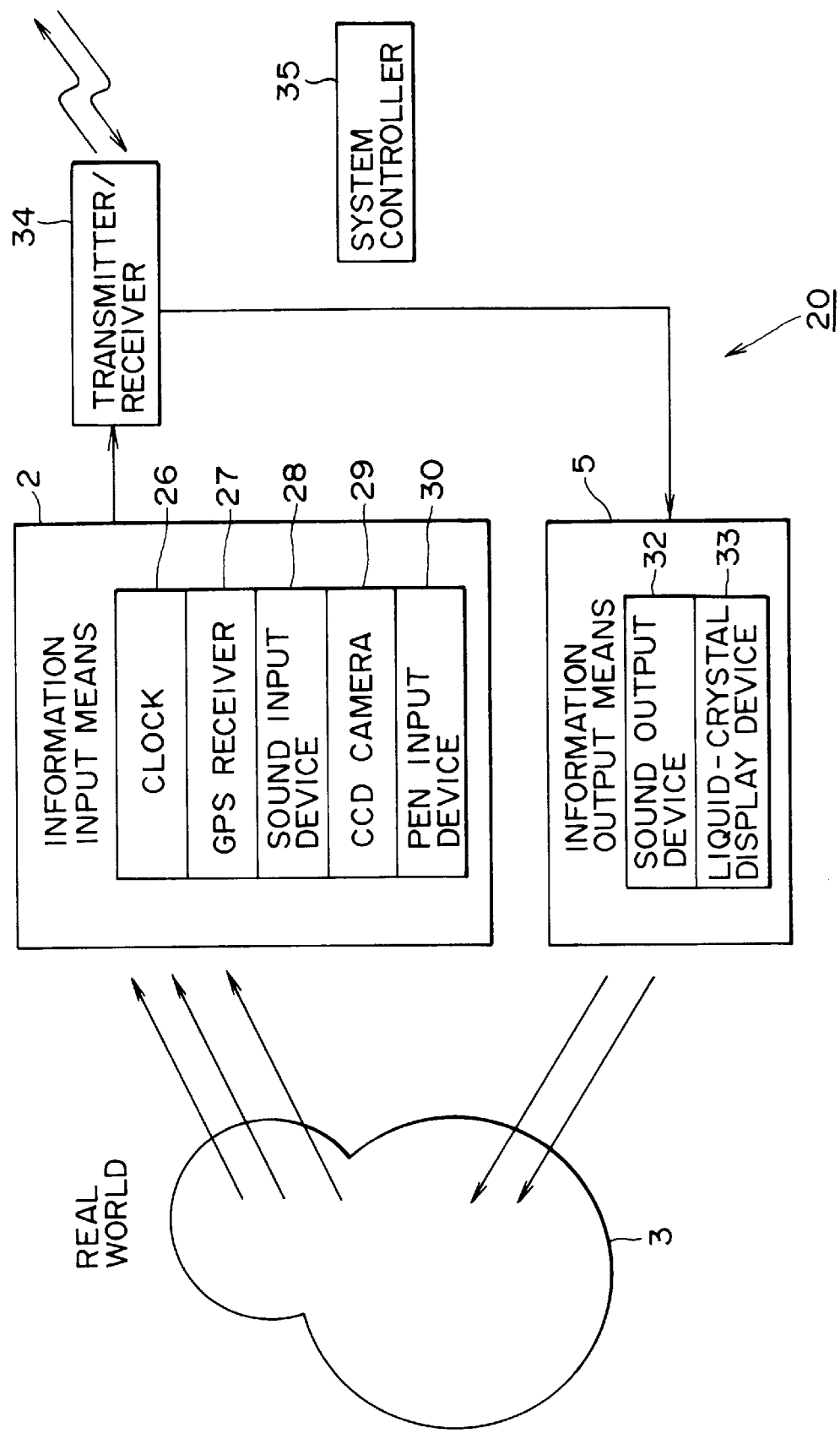
FIG. 3 is a block diagram of the terminal unit shown in FIG. 2.

FIG. 3 is a block diagram of the terminal unit 20. The terminal unit 20 incorporates an information input means 2, which includes a clock 26 for recognizing the time of day as time-wise information, and a GPS receiver 27 which processes the radio signal received by the antenna 24 thereby to produce three-dimensional locative information.

The terminal unit 20 further includes a sound input device 28 which processes the voice sound picked up by the microphone 23, a CCD camera 29 which processes the image of the subject introduced by the lens 25, and a pen input device 30 which introduces hand-written characters and detects the user's selection of items of menu on the transparent tablet 22.

With this information input means 2 made up of these devices, the terminal unit 20 obtains real-world information including the time-wise information, locative information, phonic information, image information, literal information and personal information (user's identification (ID) number). The terminal unit 20 receives these kinds of information as main information or uses the information for key generation.

The terminal unit 20 further incorporates an information output means 5, which includes a sound output means 32 which is used to monitor the sound entered by the sound input device 28 and deliver the sound sent from the server, and a liquid-crystal display device 33 which functions to display the menu of operation, monitor the hand-written characters and images entered by the pen input device 30 and CCD camera 29, and display images and texts sent from the server.

The terminal unit 20 further incorporates a transmitter/receiver 34, which is a radio communication device of the portable telephone set, by which information of various types modulated in radio signals is sent and received to/from the server through the public portable telephone network. Based on the communication with the transmitter/receiver 34 of the terminal unit 20, as well as the cell information of the portable telephone service and local telephone number, the server can have information on the current location of the terminal unit 20.

The terminal unit 20 further incorporates a system controller 35 which is a computer for controlling the whole terminal unit 20. The system controller 35 operates on the transmitter/receiver 34 to connect to the portable telephone network thereby to access to a certain server. It operates on the liquid-crystal display device 33 and pen input device 30 to display a menu screen and detect the selecting operation, while prompting the user's action by activating the information output means 5 when necessary. It operates on the information input means 2 in response to the detection result to enter information intended by the user and sends it to the server by way of the transmitter/receiver 34, and operates on the information output means 5 to deliver information of various types sent from the server in response to the user's operation.

Based on the communication with the server, the system controller 35 implements a series of control, thereby in various ways serving the user who operates the terminal unit 20.

Figure 4:
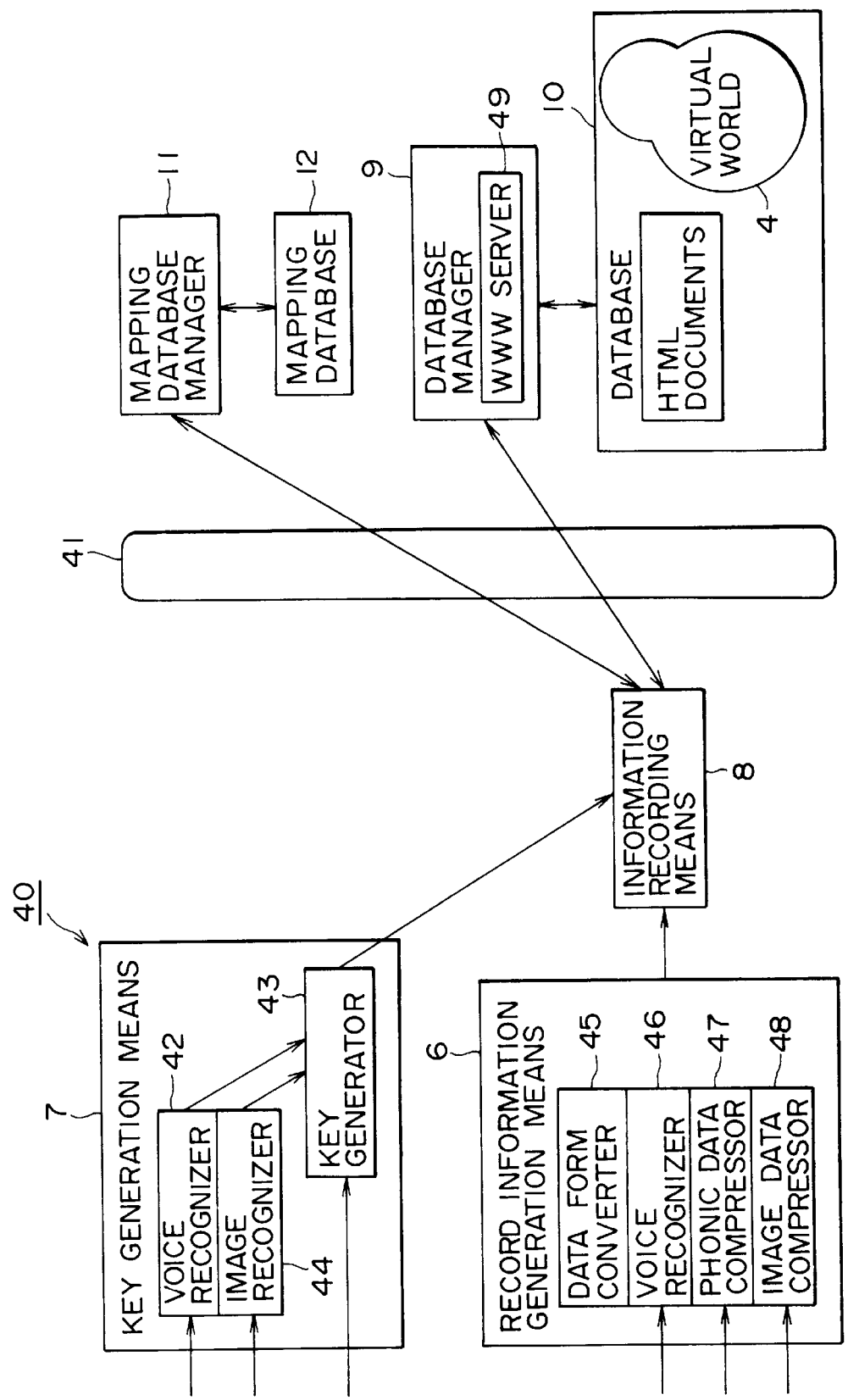
FIG. 4 is a block diagram showing the information recording system of a server or the like which is connected with the terminal unit shown in FIG. 2.
Figure 5:
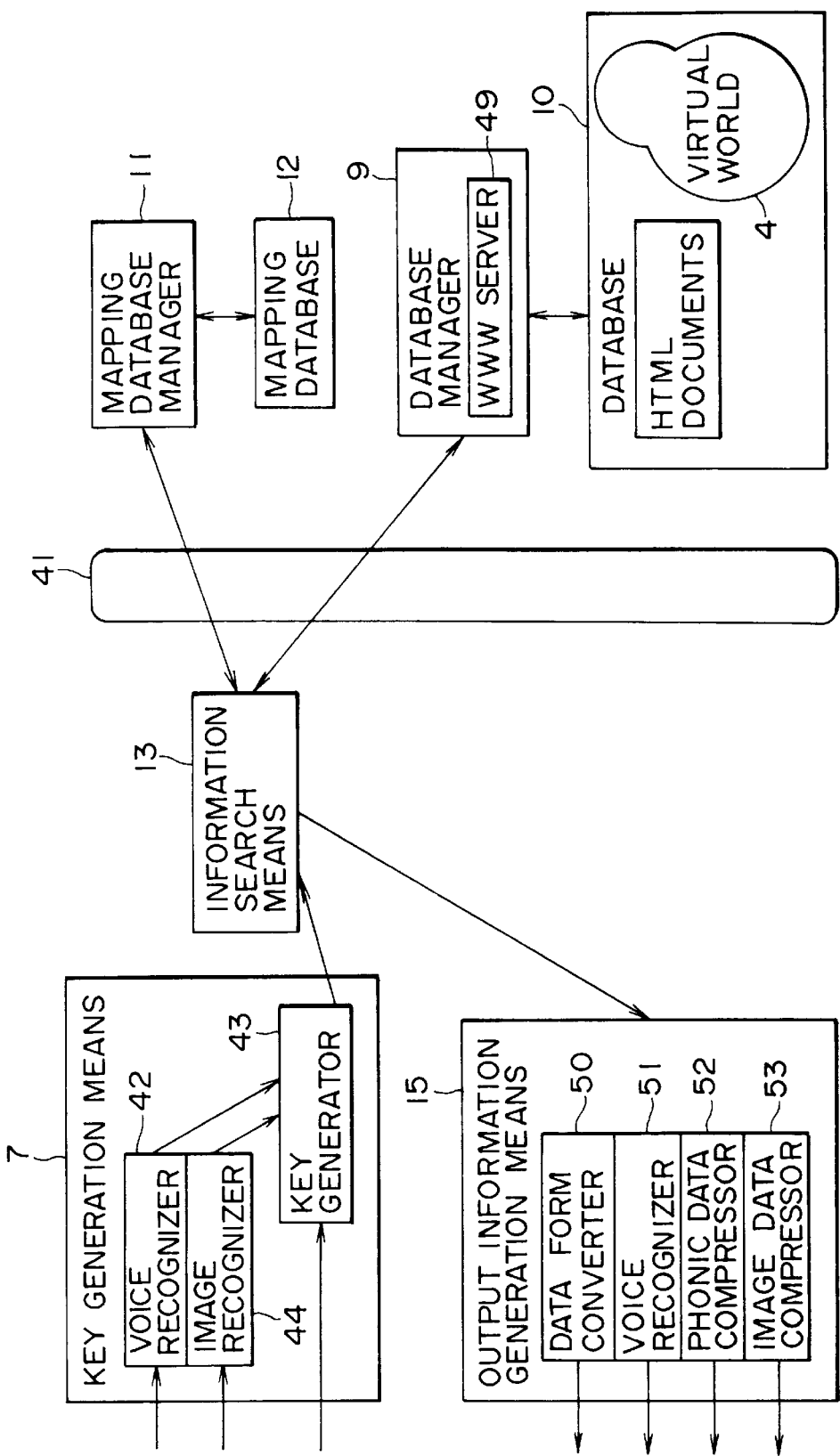
FIG. 5 is a block diagram showing the information retrieval system of a server or the like which is connected with the terminal unit shown in FIG. 2.

FIG. 4 and FIG. 5 are block diagrams of the server 40 which is connected with the terminal unit 20 through the portable telephone network, showing its information recording system and information retrieval system, respectively. The server 40 which is connected through a network 41 to the servers of the Internet, although the connection with the portable telephone network and Internet is not shown in the figures, will be explained.

The server 40 includes a key generation means 7, in which a voice recognizer 42 implements the voice recognition process for the phonic signal sent from the terminal unit 20 thereby to analyze the item of menu or request spoken by the user and gives the result of analysis to a key generator 43, and an image recognizer 44 implements the image recognition process for the image data sent from the terminal unit 20 thereby to extract a characteristic part of the image, creates a text which represent the characteristic part, and gives the text to the key generator 43.

The key generator 43 produces a key from the text and also produces keys from locative information, time-wise information, literal information and user's personal information. In case the user requests a personal service, it sets the user's ID number for a key. If the user additionally enters by voice a locative word, such as "this place", the word "this" is set for another key in addition to the user's ID number. In this manner, the key generation means 7 produces one or more keys from information of various types entered on the terminal unit 20 depending on the service requested by the user.

The server 40 further includes a record information generation means 6 shown in FIG. 4, in which a data form converter 45 implements the data conversion for phonic data, text data and image data entered directly or indirectly on the terminal unit 20 so that it fits for the database, a voice recognizer 46 implements the voice recognition process for the phonic signal from the terminal unit 20 and produces text data from the recognition result. A phonic data compressor 47 implements the data compression for the phonic data from the terminal unit 20 and gives the compressed data to the data form converter 45, and an image data compressor 48 implements the data compression for the image data from the terminal unit 20 and gives the compressed data to the data form converter 45. Output data of the data form converter 45 can thus be treated by the computer.

In this embodiment, a database manager 9 is formed of a world-wide-web server 49 of the Internet, and various files which form the database are formed of HTML documents.

Based on the foregoing arrangement, the server 40 stores main information including images, sounds and texts entered on the terminal unit 20 in connection with keys derived from locative information and time-wise information indicative of the attribute and feature of the main information, thereby forming a database.

The server 40 includes an output information generation means 15 shown in FIG. 5, in which a data form converter 50 converts information of various types retrieved from the database 10 by way of the information search means 13 back to the original data form, as opposed to the data form converter 45 in the record information generation means 6. A voice synthesizer 51 implements the voice synthesis for text data among the form-converted main information and delivers a resulting sound output. A phonic data expander 52 and image data expander 53 implement the data expansion for the compressed phonic data and image data, as opposed to the phonic data compressor 47 and image data compressor 48. Accordingly, the output information generation means 15 restores the original forms of information of various types retrieved from the database 10 and sends the restored information to the terminal unit 20.

In this manner, the server 40 implements a series of processes while communicating with the terminal unit 20 and other servers under control of the associated computer, thereby serving the user in various ways.

2.1 Town Guide Service

Figure 6:
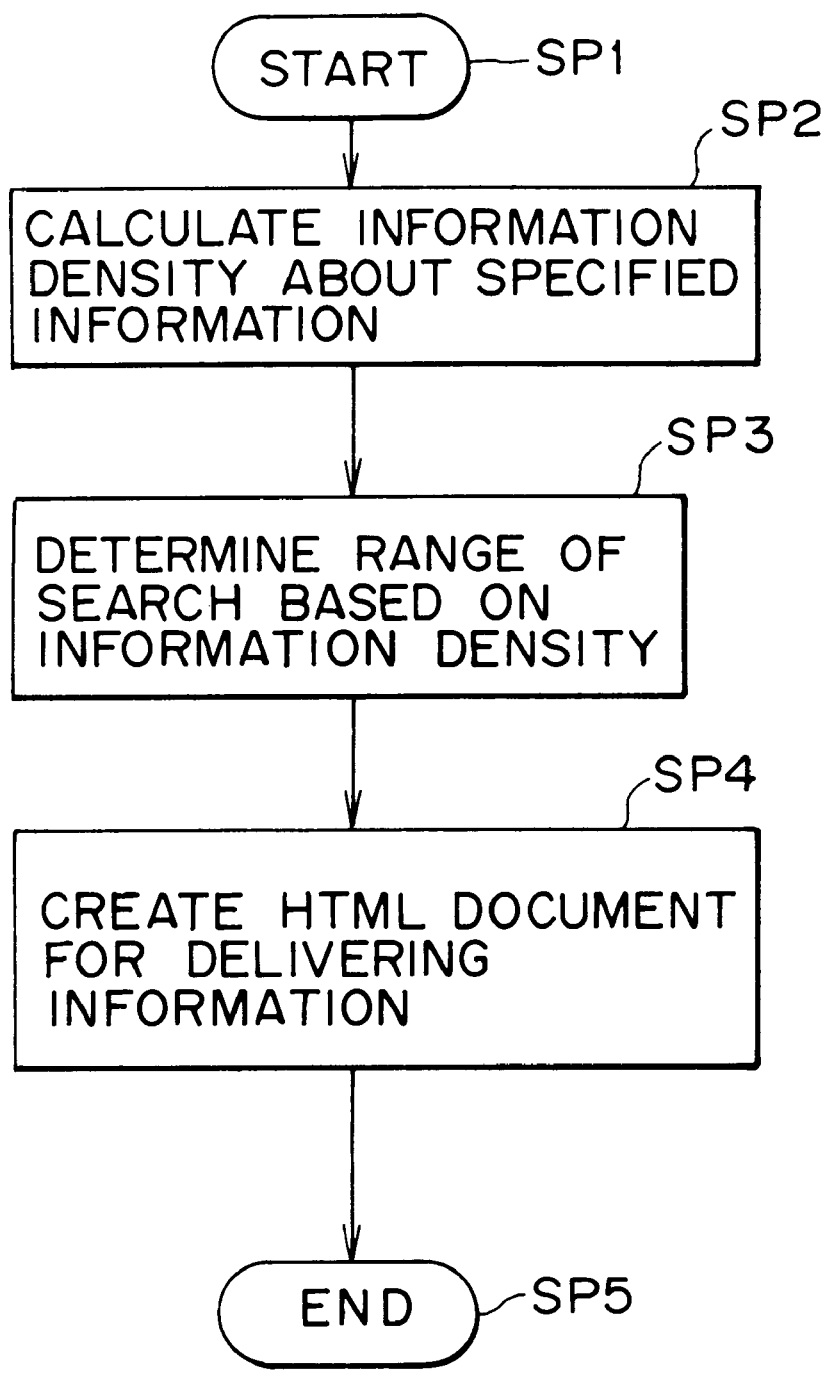
FIG. 6 is a flowchart showing the information search process of the server.

FIG. 6 shows by flowchart the process of the server 40 in response to the user's selection of the town guide service on the initial menu screen of the terminal unit 20. The server 40 advances from step SP1 to step SP2 to prompt the user of the terminal unit 20 by the synthesized spoken message or literal message to enter an item of service requested.

The user enters a spoken inquiry of "nearby restaurants?", for example. Then, the server 40 operates on the voice recognizer 42 to convert the phonic signal into a text. Otherwise, in case the user enters a hand-written inquiry, the server 40 operates on the image recognizer 44 to recognize the user's request, or in case the user selects an item of service menu, the server 40 operates on the key generation means 7 to detect the user's request.

In this manner, the server 40 responds to the user's entry of service request to receive locative information and time-wise information from the terminal unit 20 and gives the information to the key generation means 7. The key generation means 7 produces keys based on the received phonic information, locative information and time-wise information with reference to keys which have been registered in advance. Specifically, the key generator 43 sets the locative information and the word "restaurants" for keys, and gives these keys to the information search means 13. Namely, the server 40 sets the locative information "nearby" for the key indicative of the range of search, and sets the word "restaurants" for the key of search subject.

The information search means 13 operates on the mapping database manager 11 to search the mapping database 12 thereby to pick up information within the range of town guide service indicated by the key of search range and centered by the user's current location. The information search means 13 calculates the information density (number of pieces of information) pertinent to the "nearby" and "restaurants" specified by the user.

Advancing to step SP3, the information search means 13 determines the search range that fits for display on the terminal unit 20 based on the calculation result of the step SP2. The information search means 13 operates on the world-wide-web server 49 to search the database within the determined search range thereby to retrieve corresponding HTML documents. In the next step SP4, the information search means 13 generates a HTML document in the form relevant to the form of user's inquiry from the retrieved HTML documents, gives the generated HTML document to the output information generation means 15, and terminates the process at step SP5.

Figure 7:
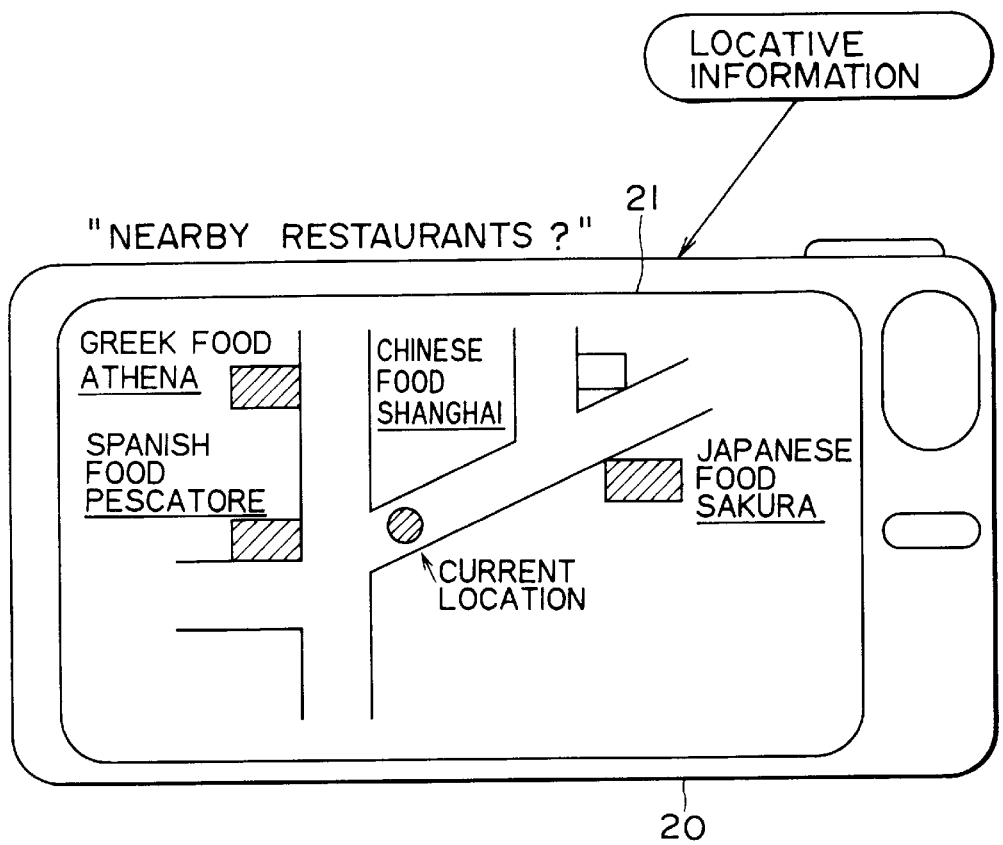
FIG. 7 is a top view of the terminal unit, showing a display of retrieved information.

Specifically, the information search means 13 generates such a HTML document as to point the locations of restaurants on the map so as to be correspondent to the user's inquiry of "nearby restaurants?", and displays the map on the screen of the terminal unit 20 as shown in FIG. 7. These restaurants are displayed in different colors depending on their grades recorded in the database 10.

Figure 8:
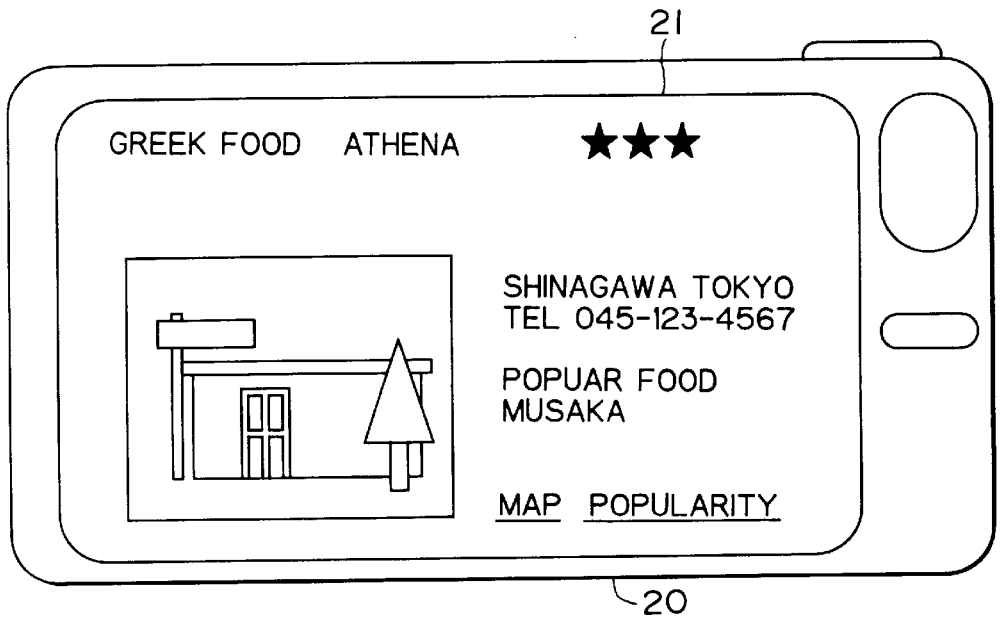
FIG. 8 is a top view of the terminal unit, showing a display of retrieved information which follows the display of FIG. 7.

Subsequently, the user operates the terminal unit 20 to designate a restaurant on the displayed map, and then the server 40 traces the established link of the HTML document to display more detailed information about the restaurant selected by the user as shown in FIG. 8. This display includes underlined labels of "map" and "popularity", and if any label is pointed by the user, the information search means 13 further traces the link to display the pertinent guide information.

For another example, if the user enters an inquiry of "restaurants used in the past week?", the information search means 13 carries out the process explained on FIG. 6 to produce a key of search range based on the time-wise information back from the present and produce a key from the user's ID number as personal information.

Figure 9:
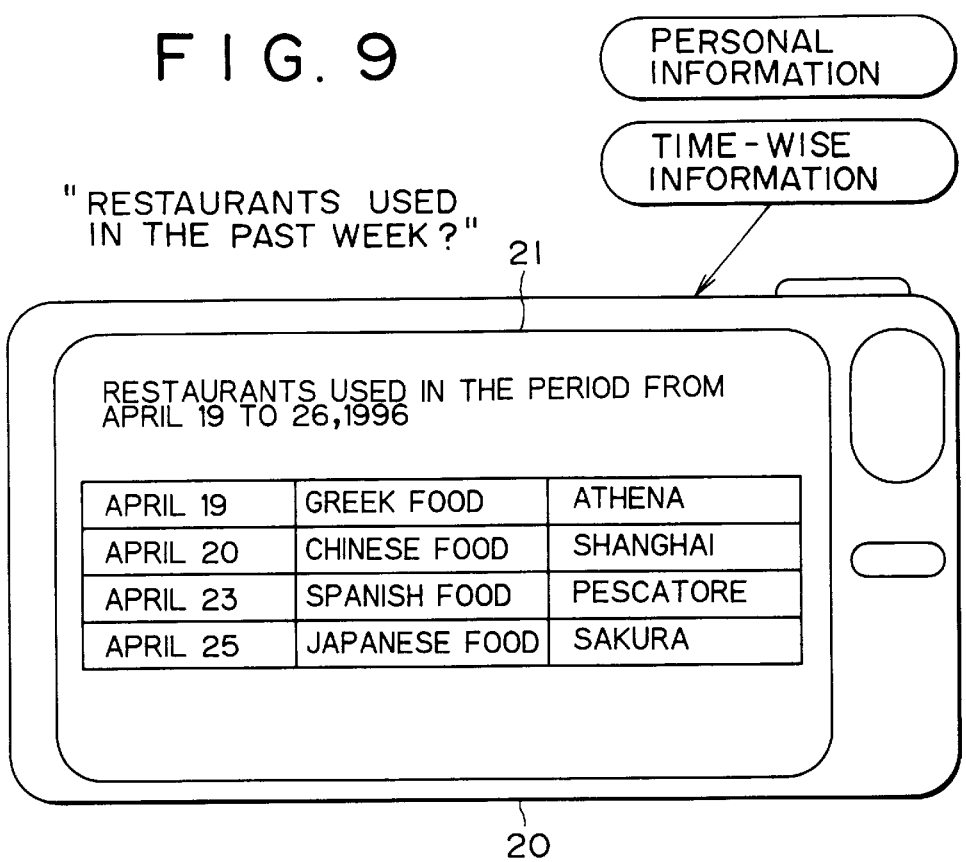
FIG. 9 is a top view of the terminal unit, showing a display of a search list.

It searches the mapping database 12 based on these keys and calculates the information density (number) pertinent to the restaurants that the user has used in the past week, thereby re-setting the search range based on the calculation result. The information search means 13 searches the determined range of the database 10 to produce a HTML document, and displays it as a list of restaurants in the order of date of use by the user as shown in FIG. 9. The linked items of guidance may be underlined in display for the enhanced convenience of the user.

Figure 10:
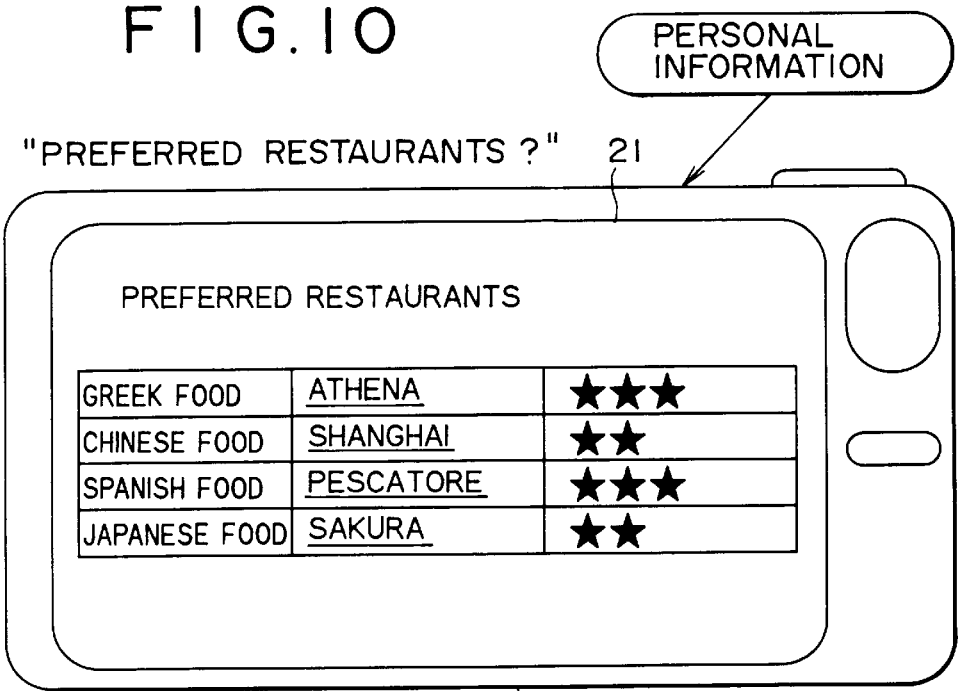
FIG. 10 is a top view of the terminal unit, showing a display of a search list which follows the display of FIG. 9.

For another example, if the user enters an inquiry of "preferred restaurants?", the information search means 13 carries out the process explained on FIG. 6 to set the user's ID number for the key of search range and set the word "restaurants" for the key of search subject. It searches the mapping database 12 and calculates the information density pertinent to restaurants, thereby resetting the search range based on the calculation result and the degree of popularity. The information search means 13 searches the determined range of the database 10 to produce a HTML document, and displays it as a list of restaurants preferred by the user as shown in FIG. 10.

Figure 11:
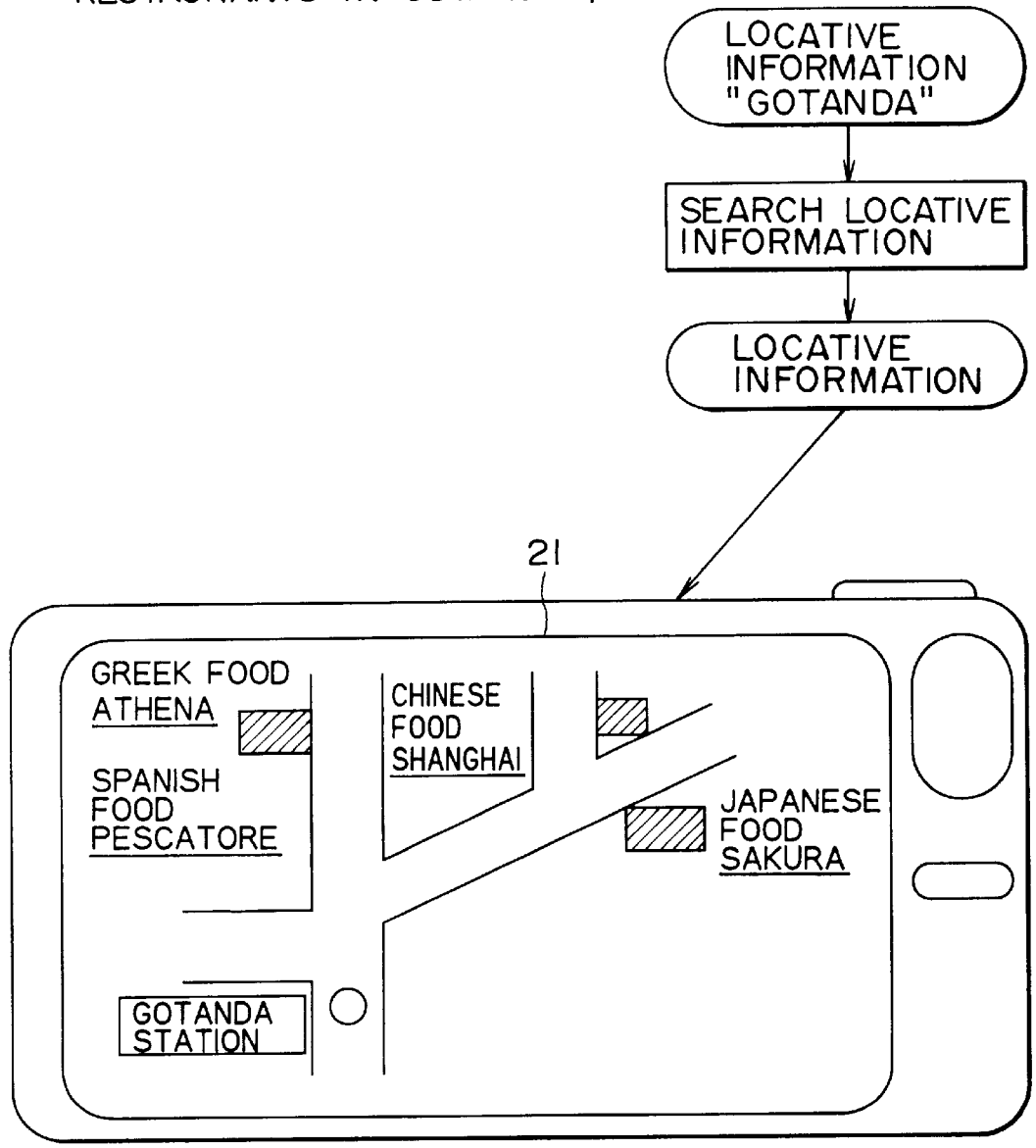
FIG. 11 is a top view of the terminal unit, showing a display of another retrieved information.

If the user enters an inquiry of "restaurants in Gotanda?", the information search means 13 carries out the process explained on FIG. 6 to analyze and set the locative information of Gotanda for the key of search range and set the word "restaurants" for the key of search subject. After resetting the search range based on the mapping database 12 when necessary, it searches the determined range of the database 10 to produce a HTML document, and displays the restaurants in Gotanda area as shown in FIG. 11.

Figure 12:
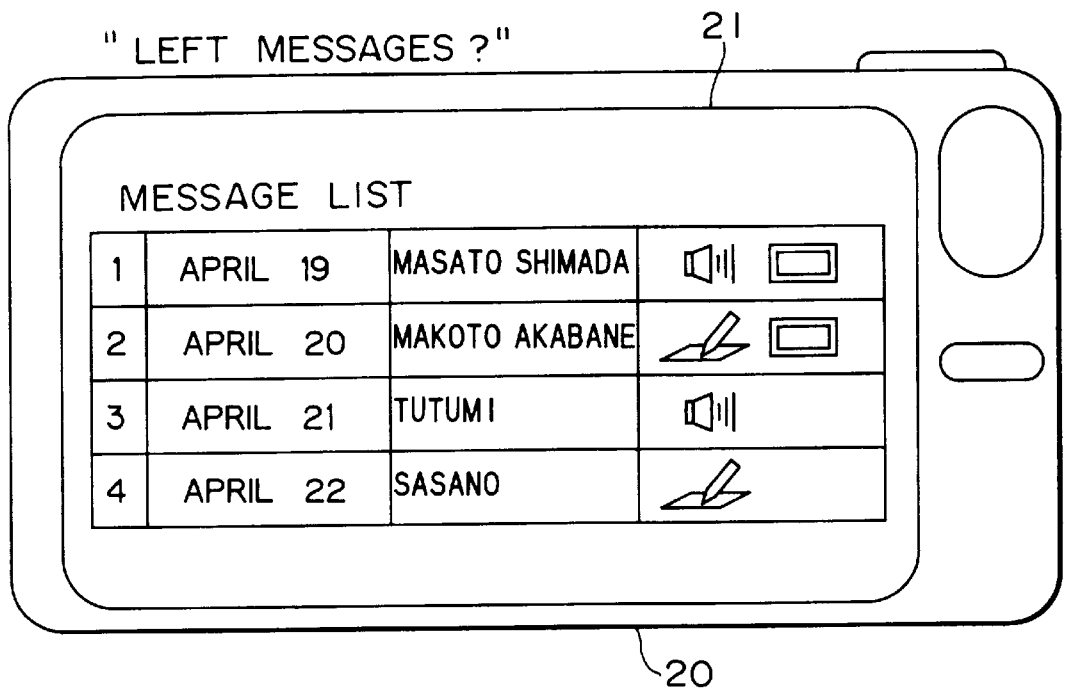
FIG. 12 is a top view of the terminal unit, showing a display of a message list.

If the user adds an inquiry of "left messages?", the information search means 13 carries out the process explained on FIG. 6 to set the search range, searches the database 10 within a certain range of period back from the present depending on the information density, and displays a list of left messages pertinent to the restaurants as shown in FIG. 12. In this case, the information search means 13 searches for left messages based on the information density in such a range as to meet the display area of the terminal unit 20. The displayed list includes fields of the date of message, the name of user who left the message, and the type of message, i.e., a speaker mark indicates a phonic message, a pencil-paper mark indicates a hand-written message, and a keyboard mark indicates a typed message.

With this message list being displayed, when the user enters an item number of the list, the server 40 searches the database 10 by tracing the link established for the number, and delivers the message relevant to that number to the terminal unit 20.

Figure 13:
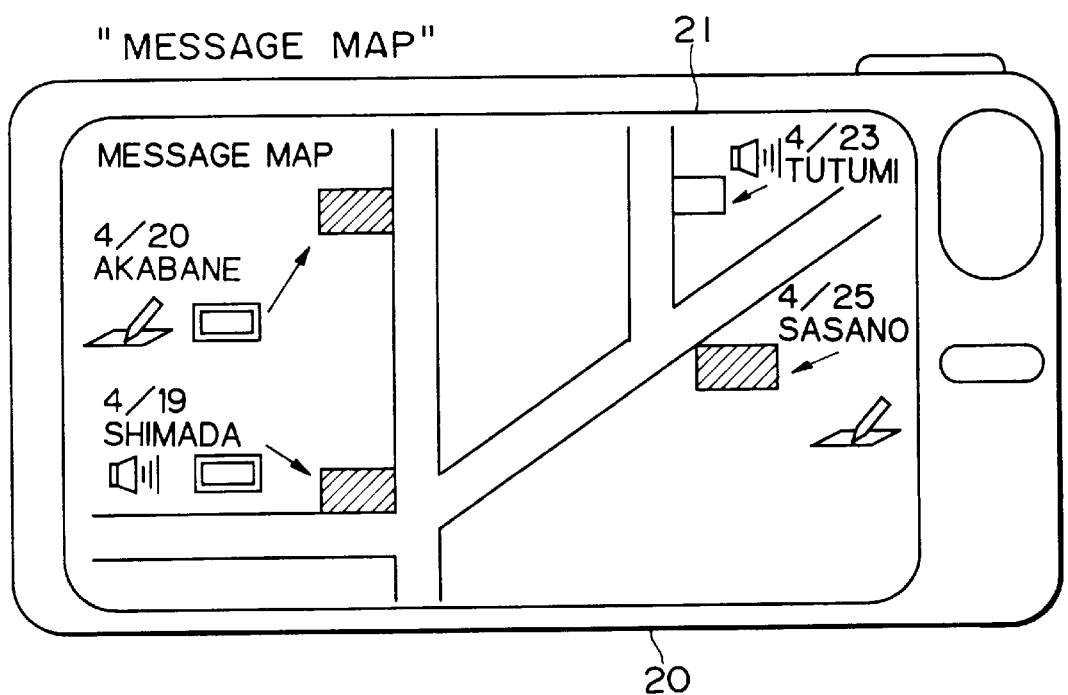
FIG. 13 is a top view of the terminal unit, showing the message list of FIG. 12 displayed on a map.

Otherwise, if the user requests a message map, the server 40 operates so that the terminal unit 20 displays the content of message list on the map as shown in FIG. 13. In case the user requests a service of message map, with the map of FIG. 7 being kept displayed, the server 40 operates for an expanded search range and the terminal unit 20 displays the areal distribution of message information by circular marks in terms of the density (number) of information in different colors (hatching in the figure).

Based on this system, the user in the real world can easily access to the virtual real world and go around the virtual real world freely along the connection between the real world and virtual world. Accordingly, it is possible for the user to fetch information of various types needed in the real world easily and surely from the database 10 and use the information effectively.

Specifically, in regard to art museums, science museums and the like, the user can acquire various information on exhibits easily on the terminal unit 20 based on keys that are images of the exhibits, or bar codes or classification codes appended to the exhibits. Similarly, the user can acquire information on the guide of commodities and shopping booths of department stores and the like or on the guide of presentation schedules of theaters and the like. The user can choose a clinic depending on the symptom and the location of home or work site as keys. The user can use the system for the tour guide or route guide, or can enjoy orienteering by carrying the terminal unit 20 based on such a provision as to divide a field into areas and present information of various types for each area sequentially.

Figure 14:
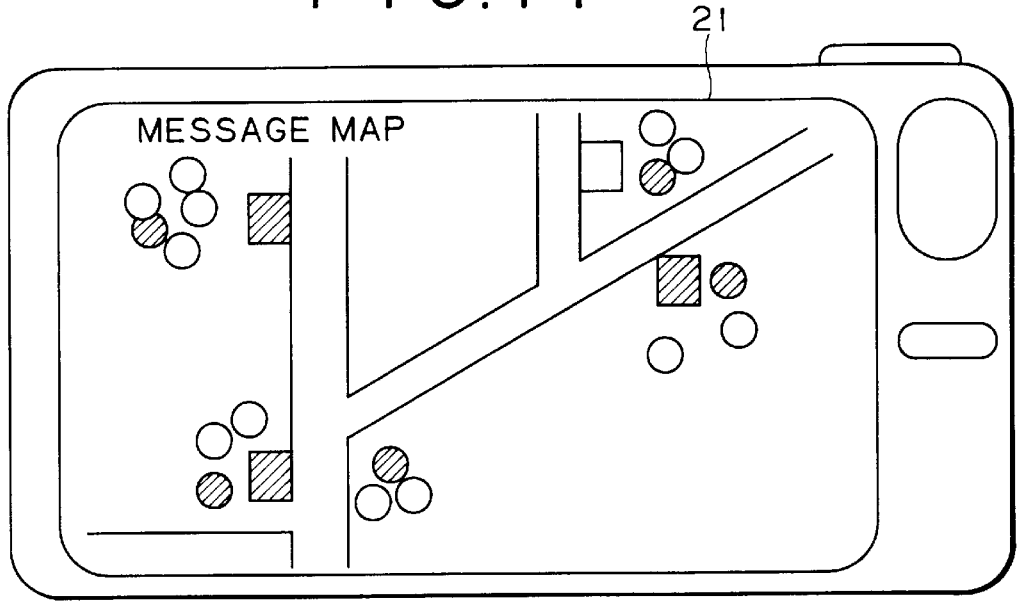
FIG. 14 is a top view of the terminal unit, showing a display of the distribution of information.

The system enables the user to known quickly the presence of the intended information based on the connection with the real world by displaying the distribution and density of information on a map as shown in FIG. 14. The system can inform the user of a hidden good sight-seeing spot based on a high registration density of image data, or can aid the user to find easily popular works in the art museum based on a high registration density of messages.

2.2 Message Service

Figure 15:
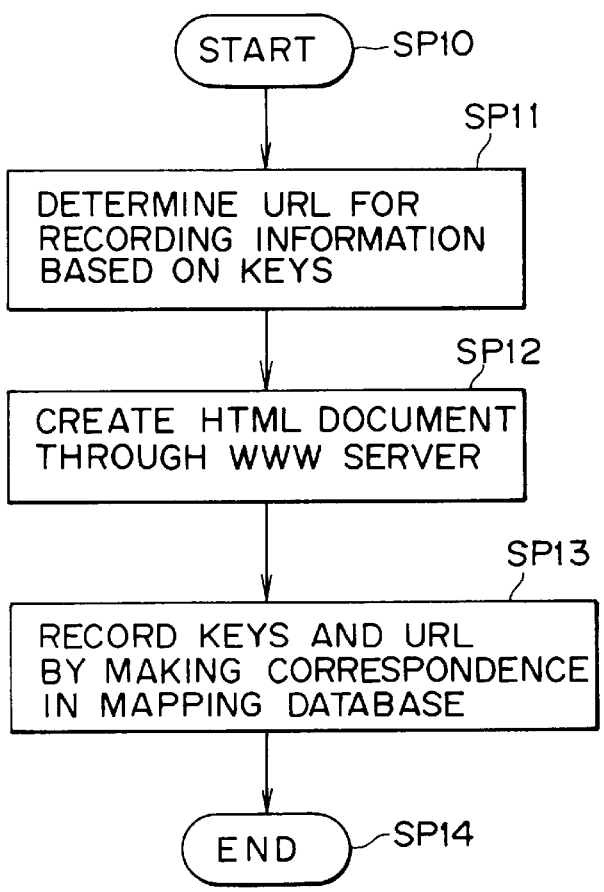
FIG. 15 is a flowchart showing the information recording process of the server shown in FIG. 5.

FIG. 15 shows by flowchart the process of message service carried out by the server 40 in response to the menu selection by the user for storing user's messages and the like as part of the main information as shown in FIG. 12

When the user enters a spoken request of "message service" for example, the server 40 advances from step SP10 to step SP11 to operate on the voice recognizer 42 to convert the voice sound into a text. Otherwise, in case the user enters a hand-written request, the server 40 operates on the image recognizer 44 to recognize the user's request, or in case the user selects an item of service menu, the server 40 operates on the key generation means 7 to detect the user's request.

On detecting the user's service request, the server 40 operates on the record information input means 2 to introduce a hand-written or spoken user message. The server 40 receives from the terminal unit 20 the locative information, time-wise information and personal information (ID number), and produces a URL for recording the message based on the key information.

When the user enters a spoken or written message of "this restaurant" for example on the terminal unit 20, the server 40 searches the mapping database 12 for keys pertinent to the locative word "this" and the user's current location, and prompts the user to check the search result. It also searches for key words similar to "restaurant" and prompts the user to check the search result.

Following the user's confirmation, the server 40 advances to step SP12 to operate on the world-wide-web server 49 to create a HTML document for the message, and registers the user message which is entered subsequently as the main information in the database 10. In the next step SP13, the server 40 records the keys and URL, with a link being formed therebetween, in the mapping database 12 so that the main information can be accessed based on the keys. The server 40 terminates the process at step SP14.

Based on providing the connection of main information, which includes phonic, image and literal information obtained in the real world, with keys, the main information can be recorded easily and surely in the virtual real world. Accordingly, by circulating the main information among all users, the system can be used to receive messages and complaints for specific subjects. It is also possible to enable only specific terminal units used by a certain company to make access to the system, thereby providing a service which substitutes a scratch notebook placed in a hotel or the like, or providing a service of electronic conference, for example.

2.3 Dejab Service

Figure 16:
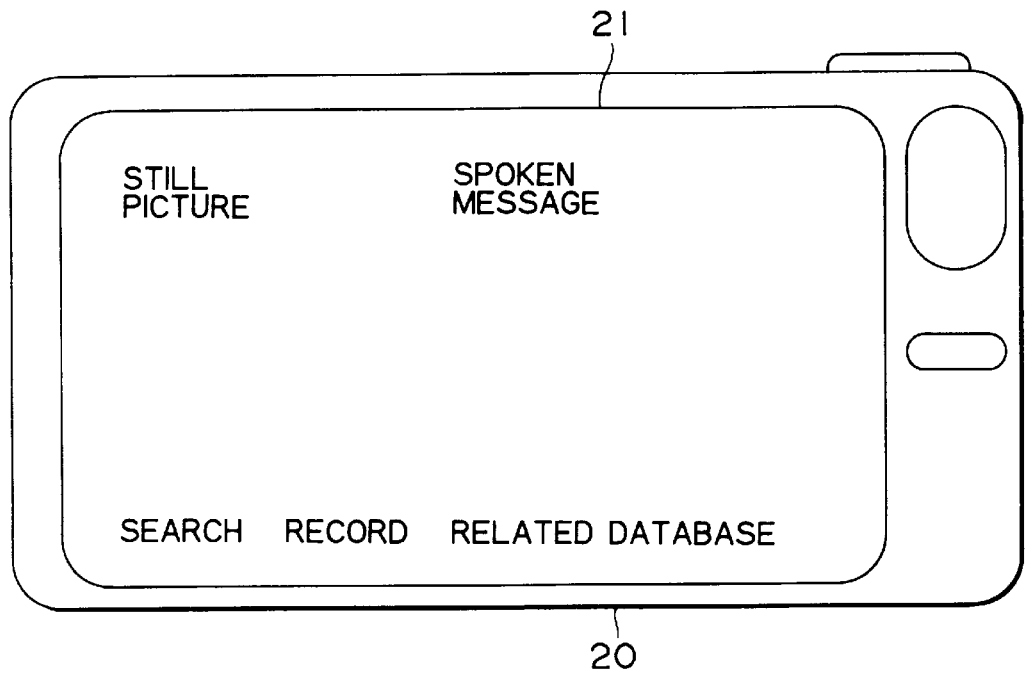
FIG. 16 is a top view of the terminal unit, showing a display of the initial screen of Dejab service.

FIG. 16 shows a display screen of the portable terminal unit used for the Dejab service of the server 40 invoked by the user. The Dejab service is intended to allow a specific user to make access to the main information stored by the user in the database based on one's ID number as a key, while rejecting the access to the information by other users.

In the operation of Dejab service, the server 40 sets a flag of access right at the recording of URL in the mapping database 12. For a request of access to the main information in any service mode, the server 40 checks the access right flag, and if the flag is found set, it verifies the user's ID number and allows the access to the main information only when the user is certified to be the access-right holder.

The server 40 receives from the terminal unit 20 main information, which is categorized at least one of image information, phonic information and literal information, and associated time-wise information, locative information and personal information, and stores the information in the database 10 with the HTML document. At the same time, the server 40 generates keys from the time-wise information, locative information and personal information, and stores the keys in the mapping database 12.

This service enables the user to store easily the record of a travel, for example, in the form of database so that it can be referenced afterward. The user can access to the main information of database about places where the user has visited in the past, and recall one's impession, etc. of the places by the aid of images, sounds and texts based on the key of locative information recorded with the main information. Moreover, the user can use this service to check the sight-seeing spots where the user has visited in the past, and can use the service for the route guide of places where the user has once visited.

FIG. 16 shows the initial screen of this service. When the user chooses "voice message" in the menu, the terminal unit 20 operates to introduce a user's spoken instruction, or if the user chooses "still picture", the terminal unit 20 operates to introduce image data of a still picture in response to the user's input operation.

When the user chooses "record" in the menu, the terminal unit 20 makes the line connection to the server 40, and thereafter sends the introduced message or image data together with the key generating information. On receiving the data and information, the server 40 records the user's spoken message or still picture in the database 10 in connection with the locative information, time-wise information and personal information as keys.

Otherwise, if the user chooses "search" in the menu, the server 40 searches the database 10 based on the key of locative information for the user's personal messages, images and texts which have been stored in the past. At this time, the server 40 displays the distribution of user's personal information by expanding the search range, thereby informing the user of one's travel route in the past in addition to the user's impression.

Figure 17:
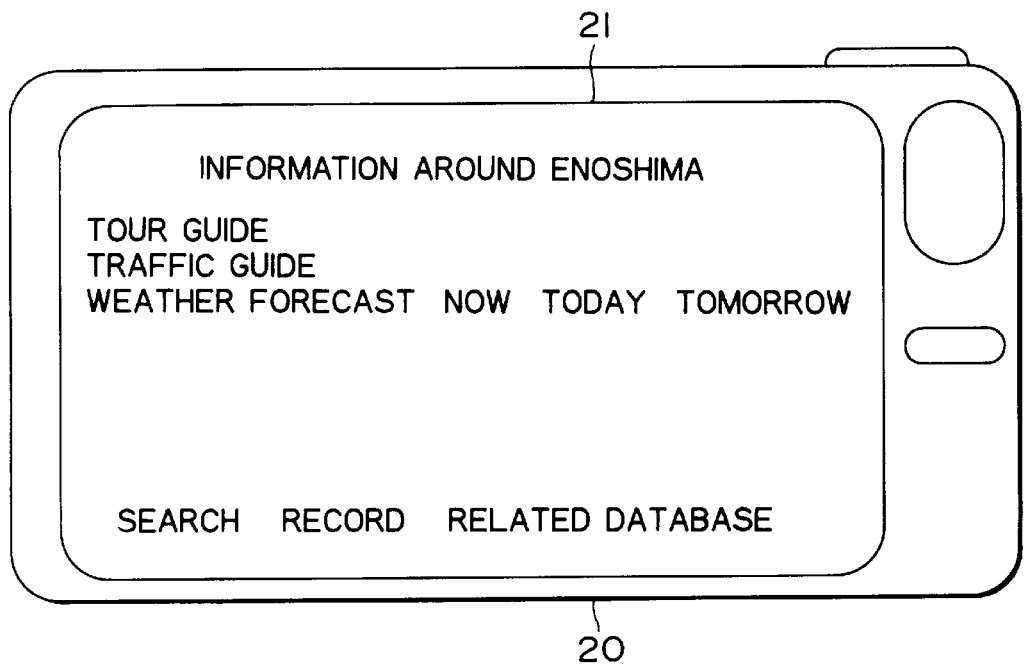
FIG. 17 is a top view of the terminal unit, showing a display of the search result for related database in the Dejab service.

Otherwise, if the user chooses "related database" in the menu, the server 40 offers various services as shown in FIG. 17 by carrying out the process explained on FIG. 6. The initial screen shown in FIG. 17 for example is displayed when the user who is near Enoshima has chosen "related database", and it includes available items of service "tour guide", "traffic guide" and "weather forecast", as well as the menu of operation.

Otherwise, if the user chooses "auto-recording" (not shown) in the menu, the terminal unit 20 introduces image data of a still picture and phonic data automatically each time the locative information varies by a certain value. The terminal unit 20 makes the line connection to the server 40 and sends the introduced image data and phonic data to it. The server 40 stores the received image data and phonic data in the database 10 and also stores the associated keys in the mapping database 12. In this case, the server 40 records additionally in literal form the name of place of the sight-seeing spot in accordance with the locative information. Consequently, the Dejab service enables the user to record one's tour route without concerning with the terminal unit 20 at all.

Figure 18:
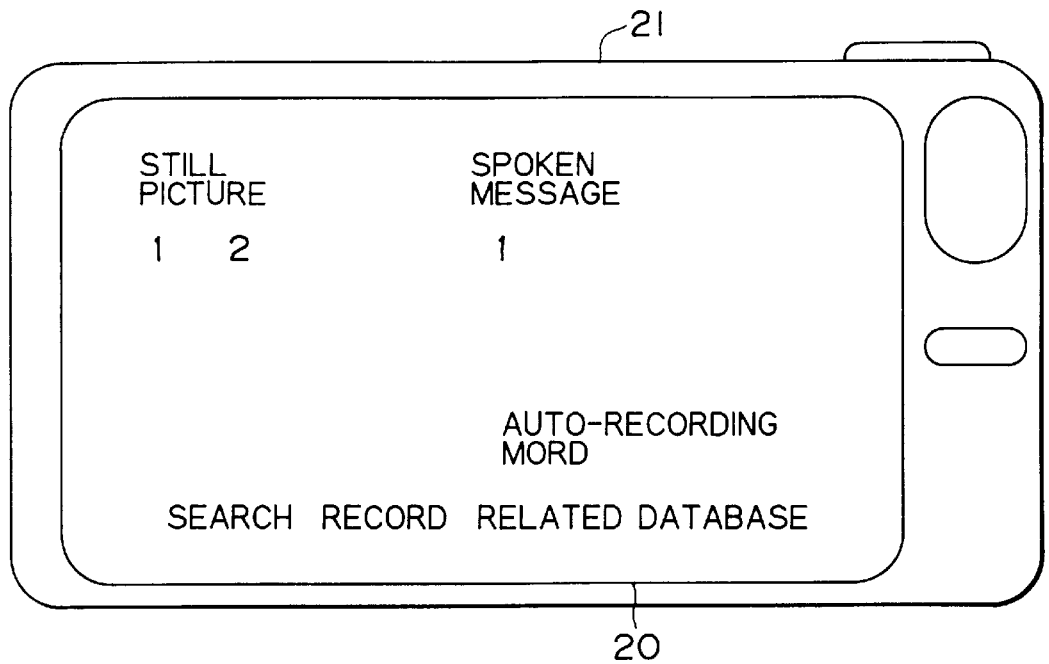
FIG. 18 is a top view of the terminal unit, showing a display of the recording result in the auto-recording mode.

FIG. 18 shows the initial screen for monitoring the result of automatic recording, and this example indicates that there are two still pictures and one spoken message recorded.

2.3 Travel Scratch Notebook Service

In this service, the server 40 records a user's hand-written text based on keys of locative information, time-wise information and the name of place of sight-seeing spot derived from the locative information, thereby forming a database of user's diary and travel logbook which can be accessed merely by the user as in the case of the preceding Dejab service. The server 40 enables the user to trace back one's memory of the past.

2.4 Message Dial Service

In this service, the server 40 stores a message entered on the terminal unit 20 into the database. It generates keys in terms of personal information which designates a message receiving person, in addition to locative information and time-wise information, and sets the access-right flag. Consequently, the server 40 delivers the user's spoken message only in response to the access made by the designated receiving person.

2.4 Effectiveness of Embodiment 1

According to the foregoing system arrangement, information obtained in the real world is stored in the database in connection with keys that are produced from the real-world information, thereby forming a link between the real world and virtual world based on the keys, whereby it becomes possible to record and retrieve information of various types easily and quickly.

3. Other Embodiments

Figure 19:
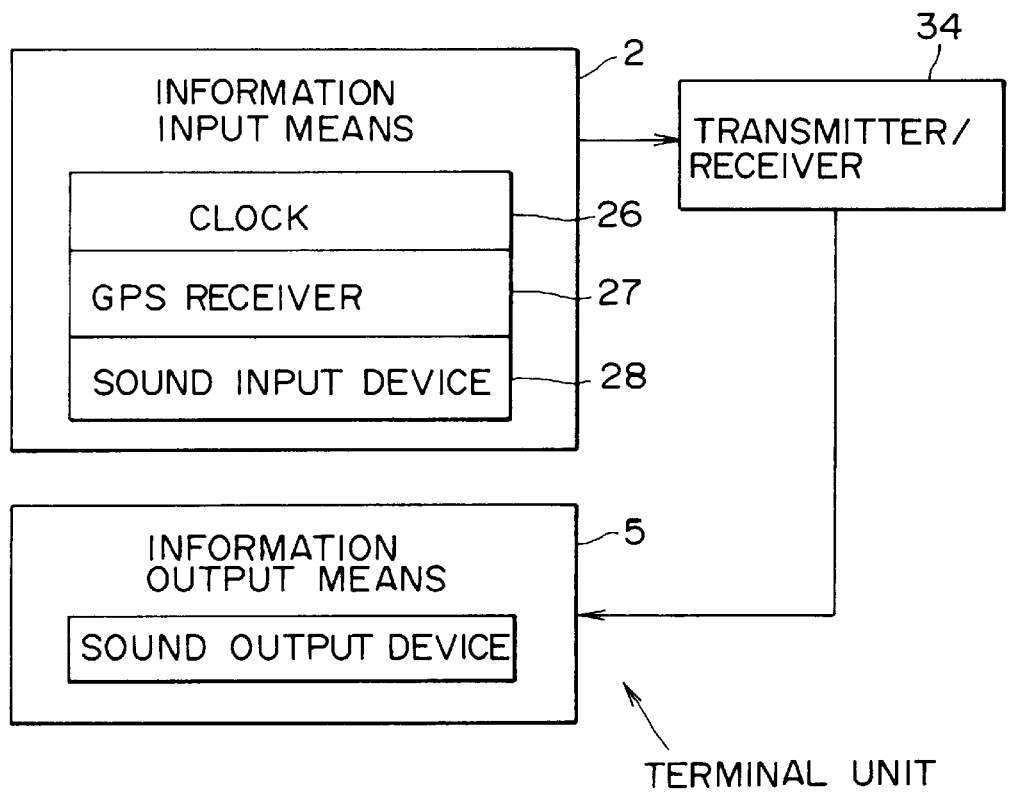
FIG. 19 is a block diagram showing the terminal unit based on another embodiment of this invention.

Although the terminal unit of the foregoing embodiment deals with image information, phonic information and literal information, the present invention is not confined to this design, but the terminal unit may be designed to deal with only phonic information. In this case, the portable terminal unit and server are arranged as shown in FIG. 19 and FIG. 20.

Although the foregoing embodiment generates keys in terms of locative information and time-wise information based on the setting of key words derived from phonic information and literal information, the present invention is not confined to this scheme, but keys may be produced from image information or keys may be phonic information itself. This variant arrangement enables the user to make access to the database based on the setting of the threshold of resemblance of keys, allowing the search of a like landscape, a like person or a piece of music that the user has once heard.

Although the foregoing embodiment generates keys in terms of time-wise information, personal information and the like, the present invention is not confined to this scheme, but keys indicative of the attribute of main information may be produced.

Although the foregoing embodiment is designed to respond to one user's search request to deliver the search result, the present invention is not confined to this scheme, but it can be applied extensively to cases in which search is conducted at once for multiple search requests. In this case, the server sorts and displays retrieved information.

Although the foregoing embodiment stores main information in the database based on a HTML document, the present invention is not confined to this scheme, but it can be applied to various cases of filing main information in various ways in the database and searching for main information in various ways.

Although the foregoing embodiment is intended to provide various services for the user who operates the portable radio terminal unit, the present invention is not confined to this purpose, but it can be applied extensively to a terminal unit which is installed fixedly.

Although the foregoing embodiment is intended to construct a database in the WWW of Internet, the present invention is not confined to this case, but it can be applied extensively to various other information networks and information processing apparatus having information storage means.

What is claimed is:

1. An information processing system, comprising:
    information input means which introduces information of the real world;
    key generation means which produces keys from the information entered by said information input means, wherein the keys are related to a characteristic of the information; and
    information recording means which stores in a database the entered information in connection with the produced keys;
    wherein the information stored in the database forms a virtual world corresponding to the real world.

2. An information processing system according to claim 1 further including:
    information search means which searches said database based on the keys; and
    information output means which delivers the result of search.

3. An information processing system according to claim 2, wherein said information search means detects the distribution of the information and said information output means delivers the result of detection of the distribution.

4. An information processing system according to claim 2, wherein said information search means detects the density of the information and said information output means delivers the result of detection of the density.

5. An information processing system according to claim 2, wherein said information search means sorts the information and said information output means delivers the result of sorting.

6. An information processing system according to claim 2, wherein said information search means searches for keys that resemble the first-mentioned keys and searches the database for the information.

7. An information processing system according to claim 2, wherein said information output means delivers the result of search to an external terminal apparatus linked by cable communication or radio communication.

8. An information processing system according to claim 1, wherein said information input means enters the information from an external terminal apparatus linked by cable communication or radio communication.

9. An information processing method comprising the steps of:
    entering information of the real world;
    generating keys based on the information entered in said information entering step, wherein the keys are related to a characteristic of the information; and
    recording the information in a database in connection with the keys
    wherein the information recorded in the database forms a virtual world corresponding to the real world.

10. The method of claim 9 wherein said step of generating keys includes the step of producing the keys from time-wise information of the real world pertinent to the information.

11. The method of claim 9 wherein said step of generating keys includes the step of producing the keys from locative information of the real world pertinent to the information.

12. The method of claim 11 wherein said step of recording includes the steps of recording the information in response to the variation of location and recording a set of information related on a time-series array.

13. The method of claim 9 wherein said step of generating keys includes the step of producing the keys from identification information which identifies the person who has entered the information or the group of people including the person who has entered the information belongs.

14. The method of claim 9 wherein said step of generating keys includes the step of producing keys from identification information which identifies said step of recording the information.

15. The method of claim 9 wherein said step of generating keys includes the step of producing the keys from an image of the real world pertinent to the information.

16. The method of claim 9 wherein said step of generating keys includes the step of producing keys from a phonic signal of the real world pertinent to the information.

17. The method of claim 9 wherein said step of recording includes the step of recording the information and keys by appending identification information which identifies the person who has entered the information.

18. The method of claim 17 further including the step of searching for the information based on the identification information.

19. The method of claim 18 wherein said step of searching includes the step of searching for the information based on the identification information so as to be only responsive to a request of the person who has entered the information.

20. The method of claim 17 wherein said information includes a set of information related on a time-series array.

21. The method of claim 20 wherein said information set is obtained at a predetermined time interval in the real world.

22. The method of claim 9 further including the steps of:
searching said database based on the keys; and
outputting the result of the search.

23. The method of claim 22 wherein said step of searching includes the step of varying the range of search depending on the density of the information which belongs to the search range.

24. The method of claim 23 wherein said step of searching includes the step of detecting the distribution of the information, and further, wherein said step of outputting includes the step of outputting the result of detection of the distribution.

25. The method of claim 23 wherein said step of searching includes the step of detecting the density of the information, and further, wherein said step of outputting includes the step of outputting the result of detection of the density.

26. The method of claim 23 wherein said step of searching includes the step of sorting the information, and further, wherein said step of outputting includes the step of outputting the result of sorting.

27. The method of claim 23 wherein said step of searching includes the steps of searching for keys that resemble the first-mentioned keys and searching the database for the information.

28. The method of claim 23 wherein said step of entering includes the step of inputting the information from an external terminal apparatus linked by cable communication or radio communication.

29. The method of claim 23 wherein said step of outputting includes the step of delivering the result of search to an external terminal apparatus linked by cable communication or radio communication.

30. An information processing system comprising:
information input means which introduces information of the real world;
key generation means which produces keys from the information entered by said information input means; and
information recording means which stores in a database the entered information in connection with the produced keys;
wherein said key generation means produces the keys from time-wise information of the real world pertinent to the information; and further
wherein the information stored in the database forms a virtual world corresponding to the real world.

31. The system of claim 30 wherein said information recording means constitutes at least part of an information network, said key generation means producing the keys from identification information which identifies said information recording means.

32. The system of claim 30 further including:
information search means which searches said database based on the keys; and
information output means which delivers the result of search.

33. The system of claim 32 wherein said information search means varies the range of search depending on the density of the information which belongs to the search range.

34. The system of claim 32 wherein said information search means detects the distribution of the information and said information output means delivers the result of detection of the distribution.

35. The system of claim 32 wherein said information search means detects the density of the information and said information output means delivers the result of detection of the density.

36. The system of claim 32 wherein said information search means sorts the information and said information output means delivers the result of sorting.

37. The system of claim 32 wherein said information search means searches for keys that resemble the first-mentioned keys and searches the database for the information.

38. The system of claim 32 wherein said information output means delivers the result of search to an external terminal apparatus linked by cable communication or radio communication.

39. The system of claim 32 wherein said information input means enters the information from an external terminal apparatus linked by cable communication or radio communication.

40. An information processing system comprising:
information input means which introduces information of the real world;
key generation means which produces keys from the information entered by said information input means; and
information recording means which stores in a database the entered information in connection with the produced keys;
wherein said key generation means produces the keys from locative information of the real world pertinent to the information; and further
wherein the information stored in the database forms a virtual world corresponding to the real world.

41. The system of claim 40 further including:
information search means which searches said database based on the keys; and
information output means which delivers the result of search.

42. The system of claim 41 wherein said information search means varies the range of search depending on the density of the information which belongs to the search range.

43. The system of claim 41 wherein said information search means detects the distribution of the information and said information output means delivers the result of detection of the distribution.

44. The system of claim 41 wherein said information search means detects the density of the information and said information output means delivers the result of detection of the density.

45. The system of claim 41 wherein said information search means sorts the information and said information output means delivers the result of sorting.

46. The system of claim 41 wherein said information search means searches for keys that resemble the first-mentioned keys and searches the database for the information.

47. The system of claim 41 wherein said information output means delivers the result of search to an external terminal apparatus linked by cable communication or radio communication.

48. The system of claim 41 wherein said information input means enters the information from an external terminal apparatus linked by cable communication or radio communication.

49. The system of claim 40 wherein said information recording means records the information in response to the variation of location and records a set of information related on a time-series array.

50. The system of claim 49 further including:
information search means which searches said database based on the keys; and
information output means which delivers the result of search.

51. The system of claim 50 wherein said information search means varies the range of search depending on the density of the information which belongs to the search range.

52. The system of claim 50 wherein said information search means detects the distribution of the information and said information output means delivers the result of detection of the distribution.

53. The system of claim 50 wherein said information search means detects the density of the information and said information output means delivers the result of detection of the density.

54. The system of claim 50 wherein said information search means sorts the information and said information output means delivers the result of sorting.

55. The system of claim 50 wherein said information search means searches for keys that resemble the first-mentioned keys and searches the database for the information.

56. The system of claim 50 wherein said information output means delivers the result of search to an external terminal apparatus linked by cable communication or radio communication.

57. The system of claim 50 wherein said information input means enters the information from an external terminal apparatus linked by cable communication or radio communication.

58. An information processing system, comprising:
information input means which introduces information of the real world;
key generation means which produces keys from the information entered by said information input means; and
information recording means which stores in a database the entered information in connection with the produced keys;
wherein said key generation means produces the keys from identification information which identifies the person who has entered the information or the group of people including the person who has entered the information belongs; and further
wherein the information stored in the database forms a virtual world corresponding to the real world.

59. The system of claim 58 further including:
information search means which searches said database based on the keys; and
information output means which delivers the result of search.

60. The system of claim 59 wherein said information search means varies the range of search depending on the density of the information which belongs to the search range.

61. The system of claim 59 wherein said information search means detects the distribution of the information and said information output means delivers the result of detection of the distribution.

62. The system of claim 59 wherein said information search means detects the density of the information and said information output means delivers the result of detection of the density.

63. The system of claim 59 wherein said information search means sorts the information and said information output means delivers the result of sorting.

64. The system of claim 59 wherein said information search means searches for keys that resemble the first-mentioned keys and searches the database for the information.

65. The system of claim 59 wherein said information output means delivers the result of search to an external terminal apparatus linked by cable communication or radio communication.

66. The system of claim 59 wherein said information input means enters the information from an external terminal apparatus linked by cable communication or radio communication.

67. An information processing system, comprising:
information input means which introduces information of the real world;
key generation means which produces keys from the information entered by said information input means; and
information recording means which stores in a database the entered information in connection with the produced keys;
wherein said information recording means constitutes at least part of an information network, said key generation means producing the keys from identification information which identifies said information recording means; and further
wherein the information stored in the database forms a virtual world corresponding to the real world.

68. The system of claim 67 further including:
information search means which searches said database based on the keys; and information output means which delivers the result of search.

69. The system of claim 68 wherein said information search means varies the range of search depending on the density of the information which belongs to the search range.

70. The system of claim 68 wherein said information search means detects the distribution of the information and said information output means delivers the result of detection of the distribution.

71. The system of claim 68 wherein said information search means detects the density of the information and said information output means delivers the result of detection of the density.

72. The system of claim 68 wherein said information search means sorts the information and said information output means delivers the result of sorting.

73. The system of claim 68 wherein said information search means searches for keys that resemble the first-mentioned keys and searches the database for the information.

74. The system of claim 68 wherein said information output means delivers the result of search to an external terminal apparatus linked by cable communication or radio communication.

75. The system of claim 68 wherein said information input means enters the information from an external terminal apparatus linked by cable communication or radio communication.

76. An information processing system, comprising:
information input means which introduces information of the real world;
key generation means which produces keys from the information entered by said information input means; and
information recording means which stores in a database the entered information in connection with the produced keys;
wherein said key generation means produces the keys from an image of the real world pertinent to the information; and further
wherein the information stored in the database forms a virtual world corresponding to the real world.

77. The system of claim 76 further including:
information search means which searches said database based on the keys; and
information output means which delivers the result of search.

78. The system of claim 77 wherein said information search means varies the range of search depending on the density of the information which belongs to the search range.

79. The system of claim 77 wherein said information search means detects the distribution of the information and said information output means delivers the result of detection of the distribution.

80. The system of claim 77 wherein said information search means detects the density of the information and said information output means delivers the result of detection of the density.

81. The system of claim 77 wherein said information search means sorts the information and said information output means delivers the result of sorting.

82. The system of claim 77 wherein said information search means searches for keys that resemble the first-mentioned keys and searches the database for the information.

83. The system of claim 77 wherein said information output means delivers the result of search to an external terminal apparatus linked by cable communication or radio communication.

84. The system of claim 77 wherein said information input means enters the information from an external terminal apparatus linked by cable communication or radio communication.

85. An information processing system, comprising:
information input means which introduces information of the real world;
key generation means which produces keys from the information entered by said information input means; and
information recording means which stores in a database the entered information in connection with the produced keys;
wherein said key generation means produces the keys from a phonic signal of the real world pertinent to the information; and further
wherein the information stored in the database forms a virtual world corresponding to the real world.

86. The system of claim 85 further including:
information search means which searches said database based on the keys; and
information output means which delivers the result of search.

87. The system of claim 86 wherein said information search means varies the range of search depending on the density of the information which belongs to the search range.

88. The system of claim 86 wherein said information search means detects the distribution of the information and said information output means delivers the result of detection of the distribution.

89. The system of claim 86 wherein said information search means detects the density of the information and said information output means delivers the result of detection of the density.

90. The system of claim 86 wherein said information search means sorts the information and said information output means delivers the result of sorting.

91. The system of claim 86 wherein said information search means searches for keys that resemble the first-mentioned keys and searches the database for the information.

92. The system of claim 86 wherein said information output means delivers the result of search to an external terminal apparatus linked by cable communication or radio communication.

93. The system of claim 86 wherein said information input means enters the information from an external terminal apparatus linked by cable communication or radio communication.

94. An information processing system, comprising:
information input means which introduces information of the real world;
key generation means which produces keys from the information entered by said information input means;
information recording means which stores in a database the entered information in connection with the produced keys;
information search means which searches said database based on the keys; and
information output means which delivers the result of search;

wherein said information search means varies the range of search depending on the density of the information which belongs to the search range; and further wherein the information stored in the database forms a virtual world corresponding to the real world.

95. The system of claim 94 wherein said information search means detects the distribution of the information and said information output means delivers the result of detection of the distribution.

96. The system of claim 94 wherein said information search means detects the density of the information and said information output means delivers the result of detection of the density.

97. The system of claim 94 wherein said information search means sorts the information and said information output means delivers the result of sorting.

98. The system of claim 94 wherein said information search means searches for keys that resemble the first-mentioned keys and searches the database for the information.

99. The system of claim 94 wherein said information output means delivers the result of search to an external terminal apparatus linked by cable communication or radio communication.

100. The system of claim 94 wherein said information input means enters the information from an external terminal apparatus linked by cable communication or radio communication.

101. An information processing system, comprising:

information input means which introduces information of the real world;

key generation means which produces keys from the information entered by said information input means; and information recording means which stores in a database the entered information in connection with the produced keys;
  wherein said information recording means records the information and keys by appending identification information which identifies the person who has entered the information; and further
  wherein the information stored in the database forms a virtual world corresponding to the real world.

102. The system of claim 101 further including an information search means for searching for the information based on the identification information.

103. The system of claim 32 wherein said information search means searches for, the information based on the identification information so as to be only responsive to a request of the person who has entered the information.

104. The system of claim 101 wherein said information comprises a set of information related on a time-series array.

105. The system of claim 104 wherein said information set is obtained at a predetermined time interval in the real world.

* * * * *